May 9, 1961 N. J. STEVENS ET AL 2,983,235
FURNACE BAFFLE
Filed May 26, 1958
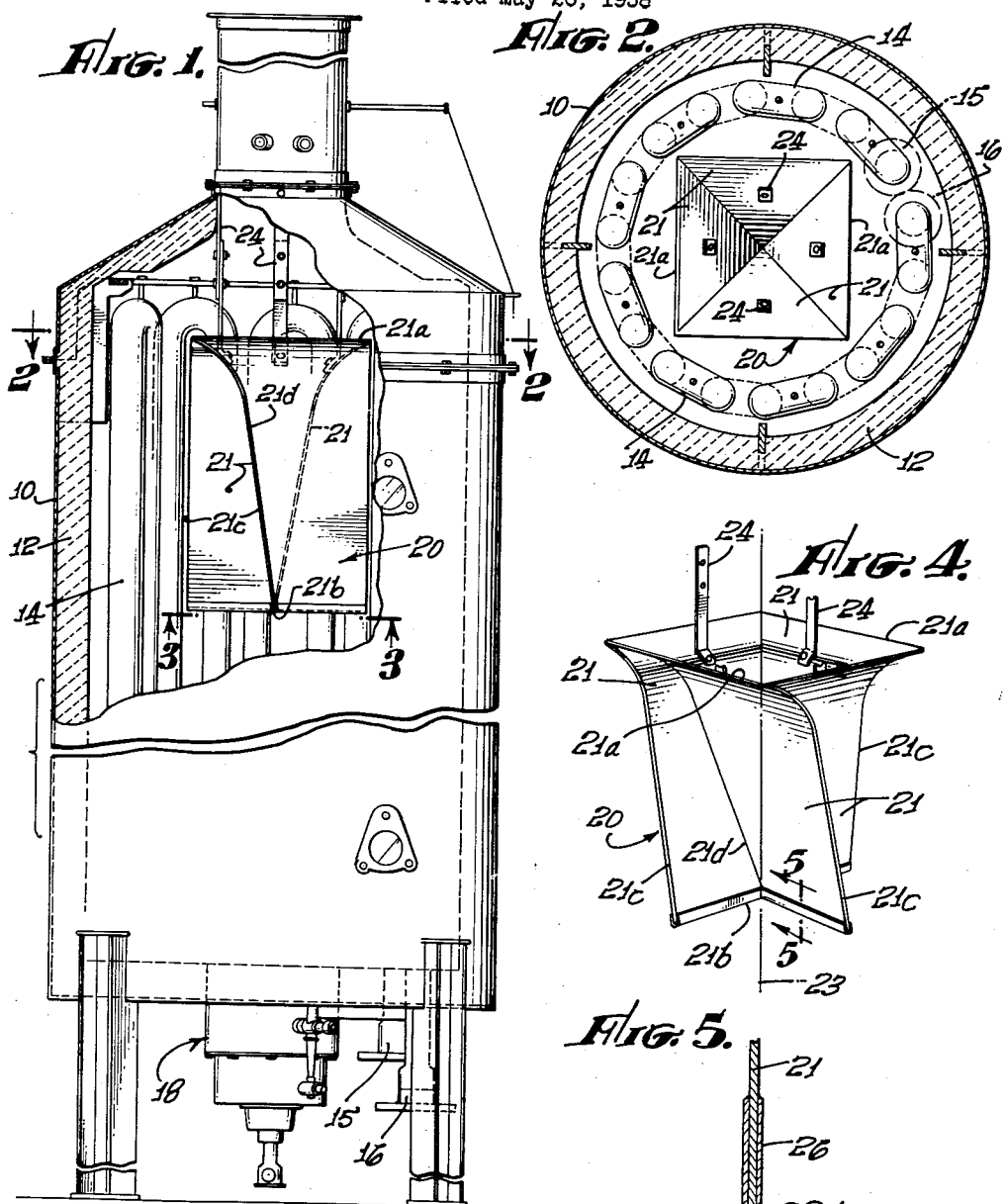
NORBERT J. STEVENS,
EDWARD B. PARKER,
THOMAS YOUSCH,
INVENTORS.
BY *Knight & Rodgers*
ATTORNEYS.

United States Patent Office 2,983,235
Patented May 9, 1961

2,983,235
FURNACE BAFFLE

Norbert J. Stevens, Alhambra, Edward R. Parker, Los Angeles, and Thomas Yousch, Pacoima, Calif., assignors, by mesne assignments, to Joy Manufacturing Company, a corporation of Pennsylvania Filed May 26, 1958, Ser. No. 737,614

4 Claims. (Cl. 110—97)

The present invention relates generally to furnace structures of the upright, radiant type, wherein tubes are spaced around the inner periphery of a furnace and are heated by a central flame from a burner mounted in the furnace base. More particularly, the invention is concerned with the provision of an advantageous baffle structure located in the upper central portion of such a furnace which insures a high rate of heat transfer to each of the tubes under all ordinary firing conditions.

Without a baffle in the upper portion of the furnace, the lower portion of each tube is heated more rapidly than the upper portion because of the higher temperatures existing in the combustion zone in the lower portion of the furnace. As the gases rise from the combustion zone, they are cooled and tend to pass through the upper portion of the combustion space without contact with the tubes. Under these conditions the gases fail to transfer the maximum possible amount of heat to the tubes. As is known in the art, the baffle increases the rate of heat transfer to the upper portion of each tube both by radiating heat from its surface directly to the tubes and also by deflecting the rising gases outwardly toward the tubes to effect better contact between the hot gases and the tubes.

Hence it is a general object of our invention to provide a baffle which contributes to the maximum efficiency and rate of heat transfer within a furnace of this character.

It is also an object of our invention to provide a baffle for a furnace of this character which accomplishes a maximum rate of heat transfer to the tubes surrounding the baffle.

A further object is to provide a baffle of novel shape which affords a maximum surface area that is effective to re-radiate to the surrounding tubes heat received from the flame or the gases.

These objects of our invention are attained by providing a baffle for use in a furnace of this character which consists of a plurality of blades which are each disposed at an angle to adjoining blades. In a preferred embodiment there are four of these blades and they are disposed at approximately a right angle to each of two adjoining blades. The blades meet at their lower edges substantially at the central axis of the baffle assembly and slope upwardly and outwardly with one upwardly extending side edge of each blade in contact with an adjoining blade. With four blades, they are arranged in the form of a cross at the bottom of the baffle and in the form of a square at the top of the baffle. Although the blades may be either curved or flat for their entire length if desired, it is preferred that they have a lower planar portion terminating in an upper curved portion. This shape is considered best to produce a high degree of turbulence in the gases as they are deflected toward the tubes.

How the above objects and advantages, as well as others not particularly referred to herein are attained, will be more readily understood by reference to the following description and the annexed drawing in which:

Fig. 1 is a partial side elevation and vertical median section of a vertical type furnace showing our baffle of novel design located at the upper portion of the combustion space.

Fig. 2 is a horizontal transverse section on line 2—2 of Fig. 1.

Fig. 3 is a bottom plan view of the baffle.

Fig. 4 is a perspective view of the baffle removed from the furnace.

Fig. 5 is a fragmentary vertical section through the lower edge of one baffle blade, on line 5—5 of Fig. 4.

Referring now to the drawing and particularly to Fig. 1 there is shown a relatively tall heater or furnace which comprises an outer shell 10 that is lined internally with refractory or heat insulating material 12. Closely spaced from the inner lining 12 is a row of vertically extending tubes 14; and it will be understood that additional rows of tubes may be used if desired, although only a single row is shown in the drawing. For practical reasons, shell 10 is normally circular in cross-section as shown in Fig. 2, so that the row of tubes 14 is a circular row; but the invention is not limited thereto.

The fluid to be heated flows through the bank of tubes 14; and the individual tubes may be inter-connected in any desired manner. In this instance the tubes are shown as provided at their upper ends with return bends of U-shape which inter-connect two adjacent vertically extending tubes. Similar bends may be provided at the lower ends of the tubes. When the individual tubes are inter-connected in this manner, the fluid flows through them serially and two of the tubes extend outside shell 10 to provide inlet and outlet connections 15 and 16.

The interior space surrounded by the tube bank constitutes the combustion space within the heater. Heat is supplied to this space by a burner indicated generally at 18 which may be of any desired type adapted to burn gas or oil as a fuel. As is well known in the art, the burner 18, which is located at the bottom of the combustion chamber, is adapted to produce the central axial flame of high intensity from which heat is transferred to the circular bank of tubes throughout a considerable portion of the vertical length of the furnace. In the lower portion of the combustion chamber where actual combustion takes place and the flame is located, heat is transferred to the tubes by direct radiation from the very hot flame.

In the upper portion of the combustion chamber and above the flame is located the baffle indicated generally at 20. The baffle alone removed from the furnace is shown in greater detail in Figs. 3 and 4.

This baffle comprises a plurality of blades 21 which may be made of any suitable material, including ceramics. Typically they are cut from steel plate of suitable composition and may be entirely covered with a protective coating of ceramic material, although such coating is not shown in the drawing. A coating of this type may be applied to protect the metal against oxidation at the high temperatures encountered in the furnace. The lower edge of each blade may be protected by an extra thickness 26 of metal or ceramic material.

Although a different number of blades 21 may be used, as will be explained, the baffle here shown is made with four blades. All four blades 21 have the same shape. The two edges 21a and 21b which are respectively at the top and bottom of the blades when assembled in the completed baffle, are straight and parallel to each other, as may be seen in Figs. 1 and 4. The edge at the outer side of the blade when assembled is indicated at 21c and is also a straight edge which in the assembled baffle assumes a substantially vertical position. The fourth or remaining edge 21d of each blade is in contact with one other blade, the two blades thus in contact being disposed at substantially 90 degrees to each other. Accordingly, edge 21d assumes a shape such that it conforms to the shape of the engaged blade along the line of contact.

Each blade preferably includes a lower flat or planar portion and an upper curved portion which curves away from the flat portion in a direction outwardly of the assembled baffle to increase turbulence in the gases as they are directed toward the tubes. However, it will be understood that the blades may be flat or slightly curved throughout their entire extent. If the blades were flat, edge 21d would be straight; but in the baffle shown in Fig. 4, edge 21d has a straight section and a curved section, as may be seen by reference to Figs. 1 and 4. It will be apparent from a consideration of the baffle and its location that edges 21a, 21b and 21c are not necessarily straight, but may have other shapes if desired.

When the four blades 21 are assembled in the completed baffle, the inner edge 21d of each blade preferably engages an adjoining blade along the whole length of the edge so that each blade is generally disposed at substantially 90 degrees to the two blades which it is in contact with. Two blades may be joined along an edge 21d by welding or in any other suitable way. The lower edges 21b are arranged in the form of a cross, as shown in Fig. 3 with the four blades meeting at the inner end of each of the lower edges on the central axis of the baffle, which axis becomes vertical when the baffle is installed in the furnace. Thus each lower edge of the blade extends radially outward from the axis of the baffle. The blades slope upwardly and outwardly from their lower edges with the result that the top edges 21a are placed in a rectangular configuration. Viewed from above, as in Fig. 2, the baffle has the appearance of an inverted rectangular pyramid. The upper end of the baffle is preferably left open. In its completed form, the overall dimensions of the baffle are determined by the length of the top edges 21a which are conveniently made twice as long as lower edges 21b. The four outer edges 21c of the four blades are disposed in vertical planes which are all parallel to the central vertical axis of the assembled blades.

An element of any blade lying in a plane perpendicular to the central axis is a straight line. Thus in any such transverse plane passing through the baffle, the baffle has the shape of a polygon. The baffle illustrated has four equal sides, but the number of sides may be other than four.

The completed baffle as shown in Fig. 4 is suspended centrally of the heater so that its axis 23 substantially coincides with the vertical axis of the heater and the baffle is surrounded by the upper portions of the tube bank 14. The baffle is suspended from the upper end of the furnace shell by a plurality of hanger straps 24. Although straps 24 may be fixed in length, it is preferable to make them each in two portions, each portion having a plurality of holes so that the two portions may be bolted together in any one of a number of positions. The result is that varying lengths may be obtained for the hanger straps. In this way the position of the baffle relative to the upper ends of tubes 14 can be adjusted up and down throughout at least a short range of movement to locate the baffle wherever it is found best.

The hot gases rising within the combustion chamber of the furnace strike the blades of the baffle and are deflected with turbulent flow outwardly toward and around the tubes 14, thus effecting a more intimate contact between the heated gases and the tubes. By occupying the central portion of the combustion space within the furnace, the baffle reduces the area available for gas flow and so compensates for the reduction in volume of the gases due to cooling. Maintaining the gas flow at higher velocity improves the rate of heat transfer since the baffle forces the rising gases to move outwardly into the zone occupied by the tubes where transfer of heat by convection can be effected directly to the tubes.

The rising gases also heat the baffle and this heat is radiated from the baffle to the tubes. Although the tubes opposite the baffle are heated to a large extent by the rising gases, a substantial proportion of heat received by the tubes is received by radiation from the walls of refractory layer 12 and the surfaces of the baffle 20. In general, the amount of heat radiated varies directly as some function of the total area available for radiation. Consequently, baffle 20 is designed to have a maximum amount of exposed area from which heat can be radiated to the tube bank. The entire external surface of each blade 21 is available for radiation, that is, all of the blade surface which is not inside the baffle. A portion of each blade radiates from both surfaces of the blades. The baffle is thus designed to provide a maximum of radiating surface in order to obtain a maximum rate of heat transfer to surrounding tubes.

Some increase in the total external surface of the baffle can be obtained by increasing the number of blades to more than four. However, as the included exterior angle between the two blades becomes less than 90 degrees, the extension of one blade beyond another tends to overlap or mask a portion of the external surface so that not all of the added external surface is available for radiation. As a result, the external surface of a baffle having a larger number of blades may be larger in total area than a four bladed baffle of comparable size, yet that surface may not be used as efficiently as in a four bladed baffle. Accordingly it is preferred to have only four blades in the baffle where possible. On the other hand, in a comparatively large furnace, say one of over four feet diameter inside the circle of tubes, a larger number of blades for a baffle may be desired in order to bring the baffle close to the tubes.

From the foregoing description it will be apparent that various changes in the exact shape, size and arrangement of the blades to our improved baffle may occur to persons skilled in the art without departing from the spirit and scope of our invention. Accordingly it is to be understood that the foregoing description is considered to be illustrative of rather than limitative upon the invention as defined by the appended claims.

We claim:

1. A baffle for use in a vertical furnace having a plurality of vertically extending tubes arranged around a combustion space, said baffle comprising:

a plurality of blades in excess of two each generally disposed at an angle to adjoining blades and secured to each other;

the blades all having their bottom edges meeting at the central axis of the baffle and extending radially away from said axis, each blade extending upwardly and outwardly with one upwardly extending side edge in contact with and conforming to the face of an adjoining blade, and the intersection of the faces of each blade with a plane perpendicular to the axis being a straight line.

2. A baffle as in claim 1 in which the upper end of the baffle has the outline of a closed polygon in a plane perpendicular to the central axis.

3. A baffle as in claim 1 in which each blade has a lower planar portion and an upper portion the intersection of which with a vertical plane is a curved line.

4. A baffle as in claim 1 in which the baffle consists of four blades each disposed at substantially 90° to the adjoining blades.

References Cited in the file of this patent

UNITED STATES PATENTS 2,512,396   Throckmorton _____ June 20, 1950

OTHER REFERENCES

Fuel and Oil Heat, Heating Publishers Inc., New York, March 1950, page 95.